May 8, 1951     M. W. WATKINS     2,552,471
HOUSING FOR ELECTRIC MEAT BLOCK SCRAPING BRUSH HAVING
SPLIT HANDLE MOTOR CIRCUIT CLOSING MEANS
Filed July 22, 1948
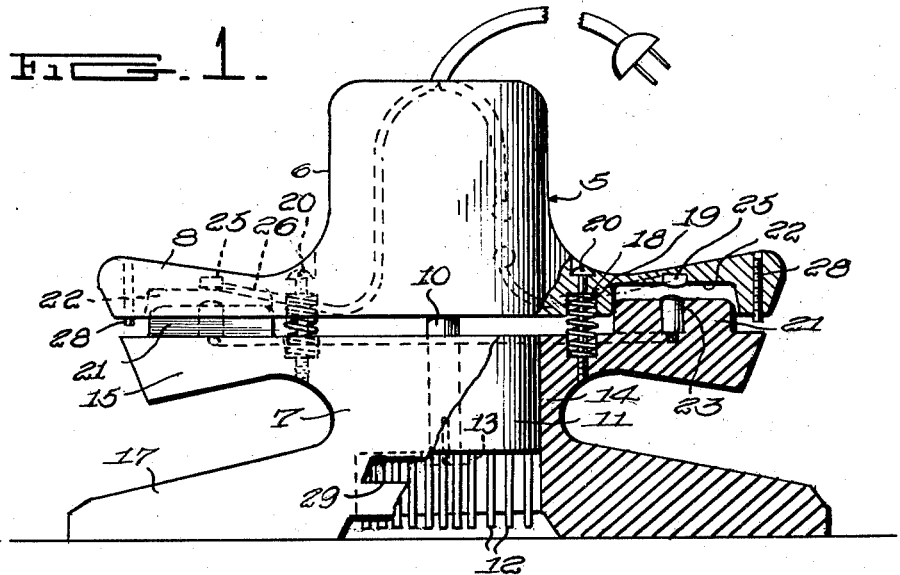
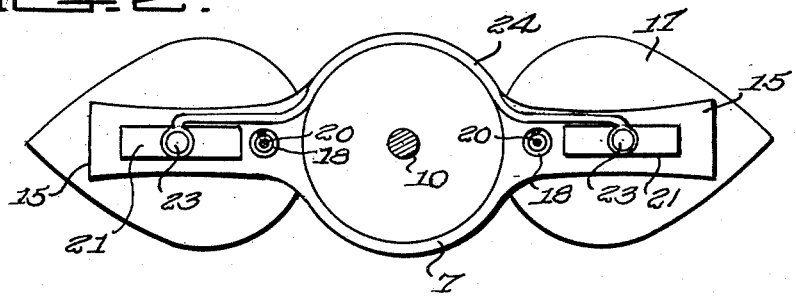
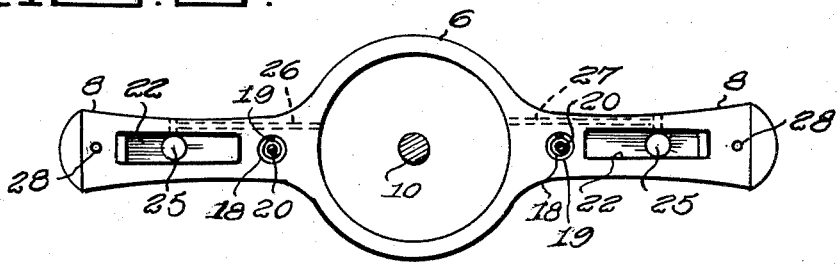
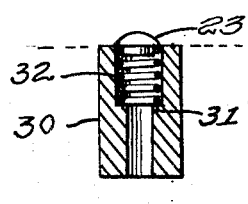
Inventor
MORRIS W. WATKINS
By Ralph Burch
Attorney Patented May 8, 1951

2,552,471

UNITED STATES PATENT OFFICE 2,552,471

HOUSING FOR ELECTRIC MEAT BLOCK SCRAPING BRUSH HAVING SPLIT HANDLE MOTOR CIRCUIT CLOSING MEANS

Morris W. Watkins, Milledgeville, Ga.

Application July 22, 1948, Serial No. 40,052

2 Claims. (Cl. 15—93)

This invention relates to an electric meat block brush for expeditiously and thoroughly cleaning meat blocks in butcher shops.

It is an object of the invention to provide an electric motor operated brush mounted in a separable housing composed of upper and lower sections with circuit closing means between the sections operable to close the circuit of the motor when the lower section is raised and compressible means normally holding the sections in spaced apart relation with the lower section in supporting engagement with the meat block and the brush in elevated relation to the surface of the block.

A further object of the invention resides in providing a device of the above-mentioned character which is simple in construction, easy to assemble and dismantle for cleaning and inexpensive to manufacture.

Other objects and advantages of the invention will be apparent during the course of the following description.

In the accompanying drawing forming a part of this specification and in which like numerals are employed to designate like parts throughout the same, Fig. 1 is a side elevational view of the brush, partly in section, Fig. 2 is a top plan view of the lower housing section, Fig. 3 is a bottom plan view of the upper housing section, and, Fig. 4 is a detail sectional view of the spring switch contact.

Referring to the drawing wherein for the purpose of illustration a preferred embodiment of the invention is shown the numeral 5 denotes generally a housing composed of upper and lower sections 6 and 7. The upper section houses a suitable electric motor and is of circular shape in cross section having oppositely extending lateral arms 8 providing handles. The shaft 10 of the motor projects downwardly from the upper section and a brush head 11 having steel bristles 12 is fixedly secured on the lower end of the shaft by a lock nut 13. The brush is adapted to rotate within the circular body 14 of the lower housing 7. The upper end of the lower section has oppositely extending lateral arms 15 co-extensive with the arms 8 providing handles for the lower section. The lower end of the lower section also has oppositely extending lateral lugs 17 of substantially heart shape and having plane bottom faces for supporting the housing on a meat block or bench when the brush is not in use.

The upper and lower sections of the housing are normally held in spaced apart relation by compression springs 18 seated in opposed recesses 19 formed in the confronting faces of the handles 8-15 adjacent their inner ends. The tension of springs 18 is adjusted by screws 20 which pass through apertures in the handles 8 and engage threaded apertures in the handles 15, thus securing the sections of the housing together. Elongated blocks 21 formed integral with the upper face of each handle 15 slidably engage in recesses 22 formed in the opposite face of the handles 8. Each block 21 carries a spring switch contact 23 which switches are connected together by a wire 24 confined in a groove formed in the body of the lower section of the housing. The spring switch contacts are clearly shown in Fig. 4 and comprise a sleeve 30 having a shoulder 31 supporting a spring 32 which normally holds the contact 23 in raised position. Contacts 25 mounted in the base of recesses 22, are respectively connected to an electric line wire 26 and the electric motor by a wire 27 whereby the circuit to the motor will be closed when switch contacts 23 and 25 are brought into engagement. A set screw 28 is mounted in the outer end of each handle 8 and projects therefrom for engagement with handles 15 to limit the relative movement between the handles. The body 14 of the lower housing section adjacent its lower end has an elongated slot 29 through which fragments and particles collected on the brush are ejected from the housing.

In operation the handles 8 and 15 of the upper and lower housing sections are normally held apart by the springs 18 in which position the contacts 23 and 25 are disengaged opening the circuit to the electric motor. In this position the lower section 7 of the housing projects below the bristles 12 of the brush with the lugs 17 in supporting position. Thus it is seen the brush is wholly confined within the body 14 of the lower section. When the operator compresses the handles 8 and 15 together, the lower section 7 moves upwardly relative to the upper section so that the bristles of the brush project below the section 7 into operative engagement with the surface of the meat block to be cleaned. The motor for rotating the brush does not start to run until the handles are compressed sufficiently to bring the contacts 23 and 25 into engagement which closes the circuit to the motor. Upon releasing the pressure from the handles, the lower section 7 of the housing is forced downwardly by expansion of the springs 18 breaking the connection between contacts 23 and 25 and the lugs 17 are moved into supporting engagement with the surface of the meat block. The device comprises a comparatively few parts which may be readily assembled and dismantled for convenience in cleaning. It is highly efficient in performing its function and saves time and labor in performing the work for which it is designed.

It is to be understood the form of my invention herein shown and described is a preferred example of the same and changes in the shape, size and arrangement of the parts may be made within the scope of the subjoined claims.

Having thus described my invention, I claim:

1. A meat block brush comprising a housing composed of upper and lower sections, means movably connecting the lower section to the upper section, opposed handles extending laterally from the sections of the housing, expansion means between the upper and lower sections normally holding said handles in spaced apart relation, an electric motor disposed in the upper section, a rotary brush attached to the shaft of said motor and entirely confined in the lower section when the upper and lower sections are apart, opposed switch contacts carried by said handles connected to the electric circuit of said motor adapted to close the electric motor circuit when the handles are compressed together and the lower section of the housing is thereby elevated relative to the upper section to expose the end of the brush.

2. A meat block brush comprising a housing composed of upper and lower sections, handles extending laterally from each section disposed in superposed relation, expansion means between the handles normally holding the sections and handles in spaced apart relation, an electric motor mounted in the upper section of said housing, a rotary brush mounted on the shaft of said motor and disposed within the lower section of said housing, lugs extending laterally from the lower section for supporting said housing when the lower section is spaced apart from the upper section, blocks formed on the upper faces of the handles of the lower section in registering relation to recesses formed in the confronting faces of the handles of the upper section, opposed switch contacts interposed in the circuit of said motor and mounted in said blocks and recesses adapted to close the motor circuit when said handles are compressed together to elevate the lower section of said housing relative to the upper section and expose the brush.

MORRIS W. WATKINS.

REFERENCES CITED

The following references are of record in the file of this patent:

UNITED STATES PATENTS

| Number | Name | Date |
|---|---|---|
| 864,403 | Beck | Aug. 27, 1907 |
| 1,581,719 | Carter | Apr. 20, 1926 |
| 1,643,882 | Faiver | Sept. 27, 1927 |
| 1,670,851 | Ferrara | May 22, 1928 |
| 1,752,940 | Cilley | Apr. 1, 1930 |

FOREIGN PATENTS

| Number | Country | Date |
|---|---|---|
| 615,404 | France | Jan. 7, 1927 |
| 585,201 | Germany | Sept. 29, 1933 |